FIG.1

INVENTOR.
JAMES J. ECKL
MARVIN A. GUETTEL
BY

FIG. 4

United States Patent Office 3,378,696
Patented Apr. 16, 1968

3,378,696
SOLID STATE SEQUENCING AND TIMING AND HEAT CONTROL CIRCUIT FOR A RESISTANCE WELDER
James J. Eckl and Marvin A. Guettel, Milwaukee, Wis., assignors to Square D Company, Park Ridge, Ill., a corporation of Michigan
Filed Dec. 24, 1964, Ser. No. 420,897
13 Claims. (Cl. 307—221)

ABSTRACT OF THE DISCLOSURE

A solid state circuit having a shift register to control the sequencing and the rate of discharge of a single timing capacitor for timing the duration of a plurality of operations, an emergency stop circuit which checks the duration of each operation, a circuit which eliminates false starts due to leakage current around the initiating switch and a circuit wherein the transformers for providing the lead-trail, delayed firing and heat control functions in a resistance welder control circuit are eliminated.

The present invention relates to electric control systems and is more particularly concerned with static logic circuitry for programming a series of operations of predetermined time duration and including improved static switching circuits.

Conventional resistance welder controllers usually are required to sequence and control a plurality of operations having respective time periods as follows: a squeeze-time period, during which the welder electrodes are moved into engagement with the parts to be welded; a weld-time period, during which welding current is caused to flow for welding the parts together; a hold-time period, during which the electrodes are held in engagement with the work to permit the welded metal of the parts to cool; and, an off-time period, during which the welder electrodes separate so they may be repositioned to form another weld. If desired, the controller may also provide a squeeze-delay period which effectively increases the squeeze-time period for the first welding sequence of a series of welds.

It is an object of the present invention to provide a control system which will control both the sequence and duration of a plurality of operations and which control system includes, a shift register having a plurality of individual stages equal in number to the number of operations to be sequenced wherein each stage is capable of existing in either of two stable conditions, a single timing capacitor, a plurality of separate circuits for discharging the capacitor through any selected one of the stages at an adjustable rate when the selected one of stages is in a predetermined condition, circuit means for impressing an initial charge on the capacitor and means responsive to a predetermined charge on the capacitor for supplying an output signal whenever the charge on the capacitor changes to a predetermined value.

Another object is to provide a control system which will control both the sequence and duration of a plurality of operations and to monitor the duration of one or more of the operations in the sequence and provide a control signal when the duration of any of the monitored operations exceed a predetermined value.

A further object is to include in a controller employing solid state components for sequencing and controlling the duration of each of a plurality of separate operations or periods which are initiated in response to the closure of an initiating switch with circuitry which will render the control substantially insensitive to high resistance shorts across the contacts of the initiating switch as may be caused by accumulations of dirt and the like.

An additional object is to provide a controller for controlling the sequence and duration of the operations of a resistance welder with a single timing capacitor which is charged at the beginning of each sequence and a shift register having a plurality of stages for controlling the sequence of operations and providing a plurality of separate discharge paths for the charge on the capacitor to control the duration of each operation and to control the shifting of the stages of the shift register with a means which also controls the instant of initiation of weld current flow and the termination of weld current flow.

A further object is to provide a control system for sequencing and timing the duration of a plurality of operations which system includes a shift register having a plurality of stages equal in number to the number of operations to be sequenced, a single timing capacitor, means including a unijunction transistor for charging the capacitor to a predetermined value and providing an output signal when the charge on the capacitor is decreased to a second predetermined value, and circuit means for discharging the capacitor at adjustable rates through any one of the stages of the shift register.

A further object is to provide a control system for sequencing and timing the duration of a plurality of operations which system includes a shift register having a plurality of stages equal in number to the number of operations to be sequenced, a single timing capacitor, means including a unijunction transistor for charging the capacitor to a predetermined value and providing an output signal when the charge on the capacitor is decreased to a second predetermined value, circuit means for discharging the capacitor at adjustable rates through any one of the stages of the shift register, and means including a solid state memory which is responsive to the output signal for supplying input signals to the stages of the shift register for causing the stages to switch from one stable condition of operation to another stable condition of operation and for maintaining the charge on the capacitor when all of the stages are in a predetermined condition.

Further objects and features of the invention will be readily apparent to those skilled in the art from the specification and appended drawing illustrating certain preferred embodiments in which.

Figure 1:
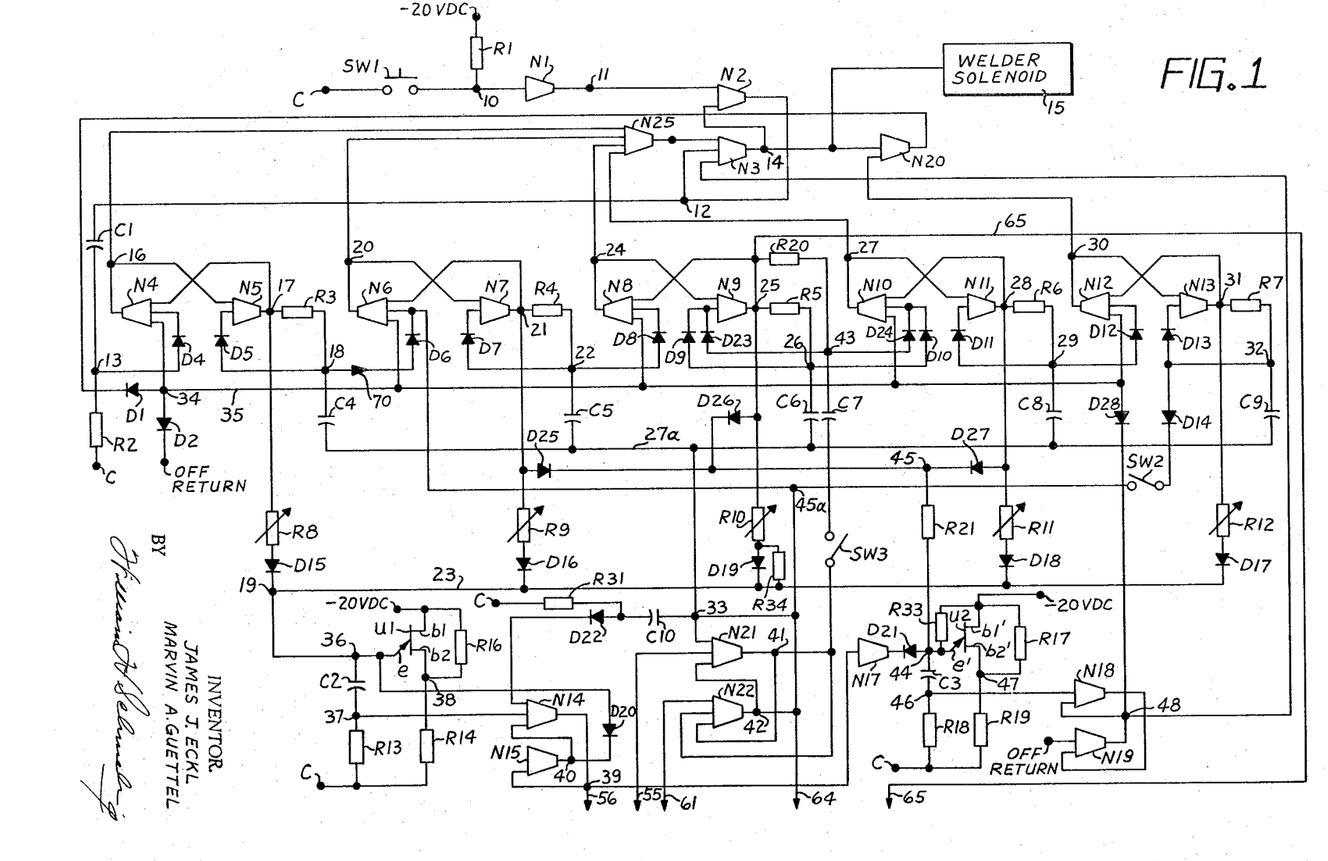
FIGS. 1 and 2 schematically show a control system employing solid state components for controlling the sequence and duration of a plurality of operations such as may be used in a resistance welder.
Figure 2:
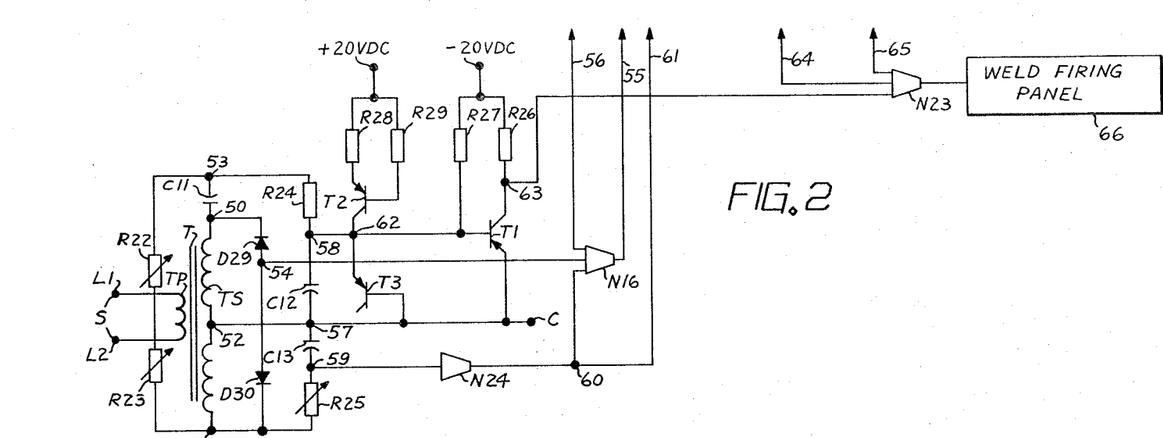

In FIGS. 1 and 2 of the drawings a plurality of NOR logic elements are shown by conventional symbols each of which will be designated with the prefix N and a numeral. The NOR units used herein are well known to those skilled in the art and are particularly disclosed in an application for U.S. patent, Ser. No. 129,828, filed Aug. 7, 1961, which has been assigned by the inventors Charles F. Meyer and James J. Eckl to the assignee of the present invention. The NOR element, as described in the foregoing Meyer et al. application and used in the circuit shown in FIGS. 1 and 2, employs a PNP transistor which has its emitter electrode connected to a common bus and its collector electrode connected through a resistor to a supply which is negative in polarity to the common bus. When this arrangement is used, a negative voltage signal at any of the inputs to the base electrode of the transistor within the NOR biases the transistor in the NOR to a conductive state to prevent the appearance of a negative polarity signal at its output terminal which is tied to the collector electrode of the transistor. Similarly, when all of the inputs to the base electrode of the transistor within a NOR are at the common bus potential, the transistor will be nonconductive and the collector voltage will follow the voltage of the negative polarity supply which is connected through a resistor to the collector electrode.

For purposes of illustration, a "0" will indicate when either an input or output of a NOR unit is at the common bus potential and a "1" will indicate when either the input or output of a NOR has a potential of the negative supply.

Thus a "1" signal at any input of the NOR causes the NOR to have a "0" output signal and "0" signals at all of the inputs of a NOR unit causes the NOR to have a "1" output signal. As will be hereinafter seen, the NOR units may be paired together to form a flip-flop circuit with each transistor of the pair having two stable conditions of operation; one in which it is conducting, and one in which it is nonconducting, and when the NORS are coupled so the output of one of the transistors is connected to an input of the other transistor of the pair, and the output of the other transistor of the pair is connected to the input of the first transistor, then the shifting of either one of the transistors of the pair of transistors from one condition to the other condition will cause the other transistor of the pair to shift its condition so that the transistors of the pair are switched to opposite conditions to thus provide a memory function.

In FIG. 1 of the drawings, a common or neutral lead or bus of a direct current supply, not shown, is connected to each of the terminals designated as C and a terminal of the source which has a negative polarity relative to the common terminals C, e.g., —20 volts D.C., is connected to each of the terminals designated by —20 v. D.C. The interconnections from the source which is connected to the terminals C and —20 v. D.C. are not shown in the interests of simplifying the drawing.

A suitable switch SW1 which has normally open contacts is connected between the terminal C and a junction 10. The junction 10 is connected through a resistor R1 to the —20 v. D.C. terminal and is connected to an input of a NOR N1. The NOR N1 has an output connected through a terminal 11 to an input of a NOR N2 which is connected with a NOR N3 to act as a NOR memory. The NOR N2 has an output connected through a terminal 12 as an input to the NOR N3 and through a capacitor C1 to a junction 13. The NOR N3 supplies an output signal to a terminal 14 which is connected to an input of the NOR N2 and through a junction to supply an input to a suitable circuitry which controls the operation of a welder solenoid which is designated by the numeral 15, and an input to a NOR N20.

The junction 13 is connected through a resistor R2 to the terminal C and through a diode D4 to an input of the NOR N4 which is connected with a NOR N5 to act as a NOR memory. The NOR N4 has an output terminal 16 connected to supply an input to the NOR N5 and an input to a NOR N25. The NOR N5 has an output connected to a terminal 17. The terminal 17 is connected to supply an input to the NOR N4 and is connected through a resistor R3 to a junction 18. The terminal 17 additionally is connected through an adjustable resistor R8 and a diode D15 to a junction 19. The junction 18 is connected through a diode D5 to an input of the NOR N5 and through a diode D6 to an input of a NOR N6. The NOR N6 has an output connected to a terminal 20 which in turn is connected to an input of a NOR N7 and an input of the NOR N25. The NORS N6 and N7 are connected as a NOR memory with the NOR N7 having an output connected to a terminal 21. The terminal 21 is connected to an input of the NOR N6. The terminal 21 is additionally connected through a resistor R4 to a junction 22 and is connected through a resistor R9 and a diode R16 to a lead 23 which is connected to the junction 19. The junction 22 is connected through a diode D7 to an input of the NOR N7 and through a diode D8 to an input of a NOR N8. The NOR N8 has an output connected to a terminal 24 which is connected to supply an input to the NOR N25 and an input to a NOR N9. The NOR N9 has an output connected to a terminal 25 which in turn is connected to an input of the NOR N8 so the NORS N8 and N9 act as a NOR memory. The terminal 25 is connected through a resistor R5 to a junction 26 and is additionally connected through an adjustable resistor R10 and a diode D19 to the lead 23. The junction 26 is connected through a diode D9 to an input of the NOR N9 and through a diode D10 to an input of a NOR N10. The NOR N10 has an output connected to a terminal 27 which is connected to an input of the NOR N25 and to an input of a NOR N11. The NOR N11 has an output connected to a terminal 28 which is connected to an input of the NOR N10 so that the NORS N10 and N11 act as a NOR memory. Additionally, the terminal 28 is connected through a resistor R6 to a junction 29 and through an adjustable resistor R11 and a diode D18 to the lead 23. The junction 29 is connected through a diode D11 to an input of the NOR N11 and through a diode D12 to an input of a NOR N12. The NOR N12 has an output connected through terminal 30 to an input of the NOR N20 and to an input of a NOR N13. The NOR N13 has an output connected through a terminal 31 to an input of the NOR N12 so that the NORS N12 and N13 act as a NOR memory. The terminal 31 is connected through a resistor R7 to a junction 32 and through an adjustable resistor R12 and a diode D17 to the lead 23. The terminal 32 is connected through a diode D13 to an input of the NOR N13 and through a diode D14 and the contacts of a switch SW2 to an input of the NOR N6. The junctions 18, 22, 26, 29 and 32 are respectively connected through capacitors C4, C5, C6, C8 and C9 to a lead 27a which is connected to a junction 33. The NOR N20 has an output connected through a diode D1 and a junction 34 to a lead 35 which is connected to an input of each of the NORS N4, N6, N8, N10 and N12. Additionally the junction 34 is connected through a diode D2 to a terminal indicated as "OFF RETURN."

As shown in the lower left portion of FIG. 1, the junction 19 is connected through a junction 36 to one side of a capacitor C2. The capacitor C2 has its other side connected through a junction 37 and a resistor R13 to the terminal C. The junction 36 is connected to an emitter electrode e of a unijunction transistor U1 which has a base electrode b1 connected to the terminal —20 v. D.C. and a b2 electrode connected to a junction 38. The junction 38 is connected through a resistor R14 to the terminal C and through a resistor R16 to the erminal —20 v. D.C. The junction 37 is connected to supply an input to a NOR N14 which supplies an output to a terminal 39. The terminal 39 is connected to supply an input to a NOR N15 which supplies an output to a terminal 40. The terminal 40 is connected to supply an input to the NOR N14 so that the NORS N14 and N15 act as a NOR memory. The junction 36 is connected through a diode D20 to the terminal 40. The NOR N14 receives an additional input through a diode D22 and a capacitor C10 from the junction 33 which is connected to supply an input to a NOR N21. A resistor R31 is connected between the terminal C and a junction located between the diode D22 and the capacitor C10. The NOR N21 has an output connected to a terminal 41 which supplies an input to a NOR N22. The NOR N22 has an output connected to a terminal 42 which supplies an input to the junction 33 and the NOR N21 so that NORS N21 and N22 act as a NOR memory. The terminal 41 is connected through the contacts of a normally open switch SW3 and a capacitor C7 to a junction 43. The junction 43 is connected through a resistor R20 to the output of the NOR N9 at the terminal 25 and through a diode D23 to an input of the NOR N9 and through a diode D24 to an input of the NOR N10. The junction 39 is connected to an input of a NOR N17 which has an output connected through a diode D21 to a terminal 44. The terminal 44 is connected through a resistor R21 to a junction 45. The junction 45 is connected through a diode D25 to the terminal 21, through a diode D26, to the terminal 25 and through a diode D27 to the terminal 28. The terminal 44 additionally is connected through a capacitor C3, a junction 46 and a resistor R18 to the terminal C. The junction 44 also is connected through a resistor R33 to the terminal −20 v. D.C. and to an emitter electrode e' of a unijunction transistor U2 which has a pair of electrodes designated as b1' and b2'. The base electrode b1' is directly connected to the terminal −20 v. D.C. and the b2' is connected through a junction 47 and a resistor R19 to the terminal C. The junction 47 is additionally connected through a resistor R17 to the terminal −20 v. D.C. The junction 46 is connected to an input of a NOR N18 which has an output connected to an input of a NOR N19. The NOR N19 supplies an output to a terminal 48 which is connected to an input of a NOR N18 so that the NORS N18 and N19 act as a NOR memory. The terminal 48 is connected to supply an input to the NOR N3. The NOR N19 additionally receives an input from an OFF RETURN terminal and supplies an output signal through the terminal 48 and a diode D28 to the lead 35.

Referring to FIG. 2 of the drawings, a transformer T has a primary winding TP connected to a suitable alternating current source S. The transformer T has a secondary winding TS which is provided with a pair of output terminals 50 and 51 and a center tap terminal 52. Connected in series between the output terminals 50 and 51 is a capacitor C11, a junction 53 and a pair of series connected adjustable resistors R22 and R23. A junction 54 is connected through a diode D29 to the terminal 50 and through a diode D30 to the terminal 51. The junction 54 is directly connected to an input of a NOR N16 which has an output connected through a lead 55 to an input of the NOR N21, shown in FIG. 1. The NOR N16 additionally receives an input from the output of NOR N14 at the terminal 39 through a lead 56. The center tap terminal 52 is connected directly through a junction 57 to a base electrode of a transistor T3, an emitter electrode of a transistor T1 and to the terminal C. The junction 53 is connected to the the junction 57 through a series circuit which includes a resistor R24, a junction 58 and a capacitor C12. Similarly, the output terminal 51 is connected through a series circuit including an adjustable resistor R25, a junction 59 and a capacitor C13 to the junction 57. The junction 59 is connected to supply an input to a NOR N24 which has an output connected through a terminal 60 to an input of the NOR N16 and through a lead 61 to supply an input to NOR N22, shown in FIG. 1. The junction 58 is connected through a junction 62 to a collector electrode of a transistor T2. The transistor T2 has an emitter electrode connected through a resistor R28 to the source of voltage which is positive in polarity relative to the common terminal C, designated as terminal +20 v. D.C. The transistor T2 also has a base electrode connected through a resistor R29 to the terminal +20 v. D.C. The junction 62 additionally is connected through a resistor R27 to the terminal −20 v. D.C. and to a base electrode of the transistor T1. The transistor T1 has a collector electrode connected through terminal 63 and a resistor R26 to the terminal −20 v. D.C. The terminal 63 which receives an output signal from the transistor T1 is connected to supply an input to a NOR N23 which also receives inputs from the NOR N22 at the terminal 42 through a lead 64 and an input from the NOR N9 at the terminal 25 through a lead 65. The NOR N23 supplies an output to a suitable weld firing panel 66 which may be of the type disclosed in the Meyer et al. application. The weld firing panel 66 is arranged upon a change in the output signal of the NOR N23 from a "0" to a "1" and from a "1" to a "0" to supply current to a suitable welding transformer which is not shown.

Figure 3:
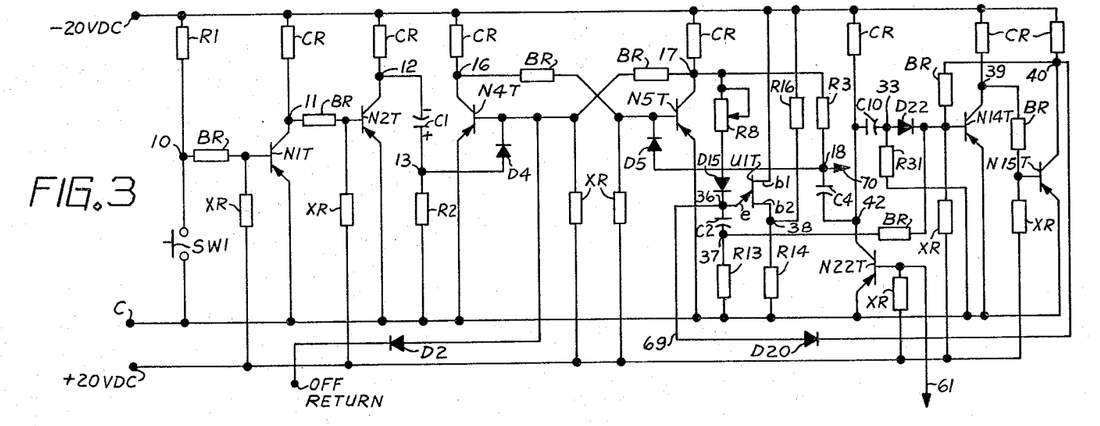
FIG. 3 schematically shows in greater detail the interconnections of certain of the circuit components used in the circuit in FIG. 1.

In FIG. 3 of the drawings, the corresponding electrical components, terminals and junctions shown in FIG. 1 are provided with corresponding designations. FIG. 3 is included to facilitate the understanding of the operation of the circuit in FIG. 1 and in greater detail illustrate the various components in their complete circuits as used in FIG. 1. The NOR units N1, N2, N4, N5, N22, N14 and N15 each include a transistor which in FIG. 3 are respectively designated as N1T, N2T, N4T, N5T, N22T, N14T, and N15T. Additionally in FIG. 3, a terminal designated as +20 v. D.C. provides a potential from a direct current source, not shown, which is positive in polarity to the terminal C and the terminal −20 v. D.C.

As in conventional NOR circuits which employ PNP type transistors, each transistor has an emitter electrode directly connected to the terminal C and collector electrode connected through an output terminal and a resistor to the terminal −20 v. D.C. The collector resistors for each of the transistors in FIG. 3 are designated as CR. Additionally, each transistor has a base electrode which is connected through a bias resistor to the terminal +20 v. D.C. and through a base resistor to a terminal which supplies an input signal. Each of the bias resistors connecting the base to the terminal +20 v. D.C. are designated as XR and the base resistors as BR in FIG. 3.

During intervals when the transistor does not receive an input signal at any input terminal which is connected to its base, the bias provided by the resistor XR normally biases the transistor against conduction so that the output terminal thereof is maintained at a potential approximate the potential of terminal −20 v. D.C. which is designated at a "1" output signal. When a negative voltage input signal which is applied to the base of the transistor overcomes the bias voltage, the transistor becomes conductive and the output terminal at the collector has a polarity approximate that of the terminal C to provide a signal designated at a "0" output signal.

In FIG. 3 of the drawings, the junction 10 is connected through the resistor R1 to the terminal −20 v. D.C. and through the switch SW1 to the terminal C. Therefore during standby condition, when the switch SW1 is opened, the junction 10 will have a "1" signal impressed thereon which biases the transistor N1T to conduction, causing the terminal 11 to have a "0" signal. The "0" signal at the terminal 11 causes the transistor N2T to be nonconductive and the terminal 12 to have a "1" signal. As the terminal 12 is at the potential of the terminal −20 v. D.C., the capacitor C1 charges from terminal C through the resistor R2, and the capacitor C1 to the terminel 12, causing the terminal 13 side of the capacitor C1 to have a positive potential relative to the terminal 12 side.

The transistor N4T has an input connected to the OFF RETURN terminal. The OFF RETURN terminal is connected to the supply for the terminals C, −20 v. D.C. and +20 v. D.C. so that when the logic circuit of the entire system is initially energized, a "1" signal will be applied to each of the OFF RETURN terminals. Thus each of the transistors which have an input terminal connected to the OFF RETURN terminal will be switched to a conductive state. Thus initially the transistor N4T has a "0" output signal and the transistor N5T, because it is connected with the transistor 4T to act as a NOR memory, will have a "1" output signal.

Further during standby conditions, when the transistor N5T is nonconducting, the capacitor C2 will be initially charged by the conduction of the unijunction transistor U1T.

When the logic system is initially energized the unijunction transistor U1T momentarily switches to a conductive state, and an initial charging current for the capacitor C2 will flow from the terminal C through the resistor R13, junction 37, the capacitor C2, the junction 36, emitter $e$ to the base $b1$ electrode of the unijunction transistor U1T to the terminal —20 v. D.C. This charging current flow ceases when the charge across the capacitor equals the supply voltage of 20 volts less the voltage drop of approximately 2 volts which is the voltage drop between the emitter $e$ to base $b1$ electrode of the unijunction transistor U1T. After the initial charging of the capacitor is completed, an additional charge is impressed across the capacitor C2 during the brief interval the transistor N15T is nonconducting. This additional charge across the capacitor C2 is caused by current flow from the terminal C through the resistor R13, the junction 37, the capacitor C2, the junction 36 and the diode D20 to the terminal 40. This additional charge equals the supply voltage of 20 volts less the forward voltage drop across the diode D20 and resistor CR which is connected to the terminal 40 approximately 1½ volts so the charge across the capacitor becomes 18½ volts.

When the capacitor C2 is discharged, as will be hereinafter explained, the junction 36 becomes more positive in polarity. When the potential across the capacitor C2 equals a predetermined value, that is, the sum of $(20-nV_{BB})$ wherein 20 is the supply voltage between terminals C and —20 v. D.C., $n$ is the intrinsic standoff ratio of the transistor U1T and $V_{BB}$ is the voltage between the electrodes $b1$ and $b2$, the unijunction transistor U1T will conduct and recharge the capacitor C2 as previously explained.

In connection with the circuit shown in FIG. 3, the resistor R16 acts as a calibrating resistor to establish the value of $V_{BB}$ and therefore the voltage at which the unijunction transistor U1T will switch to its conductive state to recharge the capacitor C2. It is well known that electrical components vary in their individual characteristics because of variables in their manufacture. The resistor R16 may be used to vary the characteristics of the circuit for variations in tolerances of the circuit components. Mathematically it can be shown that because $$V_{BB} = V \text{ supply} \times \frac{\frac{R_{BB} \times R16}{R_{BB} + R16}}{\frac{R_{BB} \times R16}{R_{BB} + R16} + R14}$$

a large change in the value of the resistance value of the resistor R16 will cause a small change in the value of the $V_{BB}$ which is the potential between junction 38 and the terminal —20 v. D.C. Thus minor variations in the resistance value of the resistor R16 will be insignificant and a suitably selected value of the resistor R16 will compensate the circuit for relatively wide deviations in the electrical parameters of the capacitor C2, the unijunction transistor U1T and the resistors R13 and R14.

Further during standby conditions as the transistor N5T is nonconducting and the transistor N22T is conducting, for the reasons which will be later explained, the junction terminal 17 will be at the potential of the terminal —20 v. D.C. Therefore the capacitor C4 charges with the polarity which causes the terminal 42 to have a positive polarity relative to the junction 18 side of the capacitor C4. As will be later explained, a short time interval after the capacitor C2 is charged as above set forth, the transistor N14T switches to a nonconductive state. As the transistors N14 and N15 are connected as a NOR memory, the transistor N15 is biased to conduction which causes the terminal 40 to have a "0" potential. Additionally, as the transistor N22T is conducting, the capacitor C10 is not charged because one side of the capacitor C10 is maintained at the potential of the terminal C through the emitter and collector electrodes of the conducting transistor N22T and the other side of the capacitor C10 is maintained at the potential of the terminal C by the circuit which includes the resistor R31.

One of the advantages of the circuit shown in FIG. 3 is that it will reduce the possibility of false operation of the circuit because of high resistance current paths which may develop across the initiating switch SW1 due to accumulations of foreign matter. It is well known that in conventional PNP type transistors for a given value of resistance in circuit with the collector electrode, the transistor will begin conducting small amounts of collector electrode current when the base electrode becomes slightly negative in polarity relative to the emitter electrode and will conduct a maximum collector electrode current when the base electrode has a greater negative polarity relative to the emitter electrode. If, for example, in a given transistor circuit, the transistor should begin conducting collector current when the base electrode is 2 volts negative relative to the emitter electrode and maximum collector current when the base electrode is six volts negative relative to the emitter electrode, then if the switch SW1 were connected between the base electrode of the transistor N1T of the NOR N1 and the terminal —20 v. D.C. with a resistor between the base electrode and the terminal C, anytime a high resistance leakage path across the initiating switch occurred which would permit the base electrode to change and become 2 volts negative relative to the emitter electrode, the output signal of the transistor N1T of the NOR N1 would begin to change from "1" to "0" and would be fully changed to provide a "0" signal at some voltage less than 6 volts.

When the circuit according to the present invention is employed wherein the base of the transistor N1T is connected through the normally open contacts of the switch SW1 to the terminal C and through the resistor R1 to the terminal —20 v. D.C., normally the transistor N1T will be biased to full conduction by the 20 volt difference between its base and emitter. Thus in the event of a high resistance leakage path which may develop across the switch SW1 the voltage at junction 10 would be required to drop approximately 14 volts before the transistor N1T would begin to be biased against conduction. It is clearly apparent that in the previous embodiment explained, the 2 volt change would cause the conduction of the transistor to change to begin to provide a signal change of "1" to "0." In the embodiment shown in FIG. 3, a 14 volt change is necessary to accomplish the change in the output of the transistor N1T from "0" to "1" and therefore a circuit that is less susceptible to contaminations of the initiating switch is provided.

When the initiating switch SW1 is closed, a "0" signal which appears at the junction 10 causes the transistor N1T to switch from its conductive state to a nonconductive state and supply a "1" signal at the terminal 11. The "1" signal at terminal 11 causes the transistor N2T to switch to its conductive state making the terminal 14 positive. The change in potential at the terminal 14 causes the positive potential present at the junction 13 from the capacitor C1 to appear as a sharp voltage pulse which is conducted through the diode D4 directly to the base of the transistor N4T. The positive voltage pulse through diode D4 causes the transistor N4T to switch to a nonconductive state and supply a "1" signal at the terminal 16. The "1" signal at terminal 16 is supplied as an input to the transistor N5T which causes the transistor N5T to switch to a conductive state and supply a "0" signal at the terminal 17. The capacitor C2, when the transistor N5T switches to its conductive state, begins to discharge through a circuit which includes the junction 37, the resistor R13, the emitter to collector of the transistor N5T, the terminal 17, the resistor R8, the diode D15 and the junction 36. The rate of discharge of the capacitor C2 will be determined by the resistance value of the adjustable resistor R8. After the charge on the capacitor C2 has been dissipated to a predetermined value as previously explained, the unijunction transistor U1T will switch to a conductive state supplying a charging path for the capacitor C2. When the unijunction transistor U1T suddenly switches to its conductive state, the potential at the junction 37 suddenly becomes more negative and appears as a sharp negative voltage pulse which is transmitted as an input to the transistor N14T. The negative voltage pulse at the junction 37 causes the transistor N14 to switch to its conductive state and supply a "0" input signal to the transistor N15 which again switches to its nonconductive state.

During the interval when the transistor N5T is conducting and the transistor N22T is conducting, the charge on the capacitor C4 dissipates and the junction 18 potential changes to become approximately equal to the potential of terminal C.

In a manner which will be hereinafter explained, the conductive state of transistor N22T switches to a nonconductive state for a brief time interval during the interval the transistor N14T is conducting. When the transistor N22T is nonconducting and the transistor N5T is conducting, the capacitor C4 charges in a direction making the junction 18 positive in polarity relative to the junction 42. Also when the transistor N22T is in a nonconductive state, the capacitor C10 charges through a circuit which includes the resistor R31, the junction 33, the capacitor C10, and the collector resistor of transistor N22T. The charging current flow causes the junction 33 side of the capacitor C10 to become positive in polarity relative to the junction 42 side. After the capacitors C4 and C10 are thus charged, the transistor N22T is switched to a conductive condition, the potential at the terminal 42 changes and becomes more positive in polarity. This change in potential at the terminal 42 causes the charge on the capacitor C10 to be delivered as a positive voltage pulse through the diode D22 directly to the base of the transistor N14T to bias the transistor against conduction so that its output becomes "1." The "1" output of the transistor N14T is delivered as an input to the transistor N15T which switches to its conductive state to supply a "0" output signal at the junction 40. Also when the potential at terminal 42 changes and becomes more positive, a positive voltage pulse is delivered from the capacitor C4 through the diode D5 to switch the transistor N5T to a nonconductive state to cause a "1" output signal to appear at the terminal 17 which is delivered as an input signal to the base of the transistor N4T so that its output switches to "0."

Figure 4:
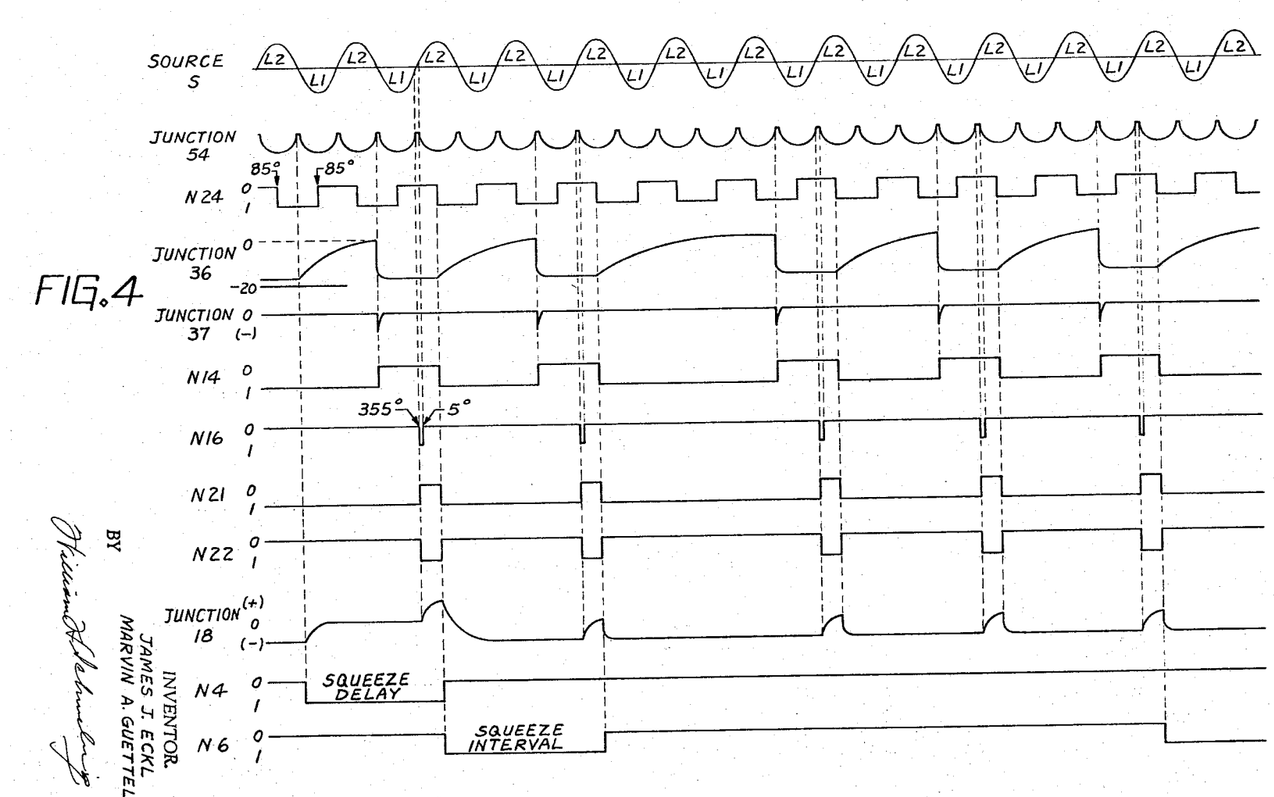
FIGS. 4 and 5 graphically illustrate the electrical condition of the various terminals and junctions appearing in FIGS. 1 and 2 during instants determined by an alternating voltage wave source.
Figure 5:
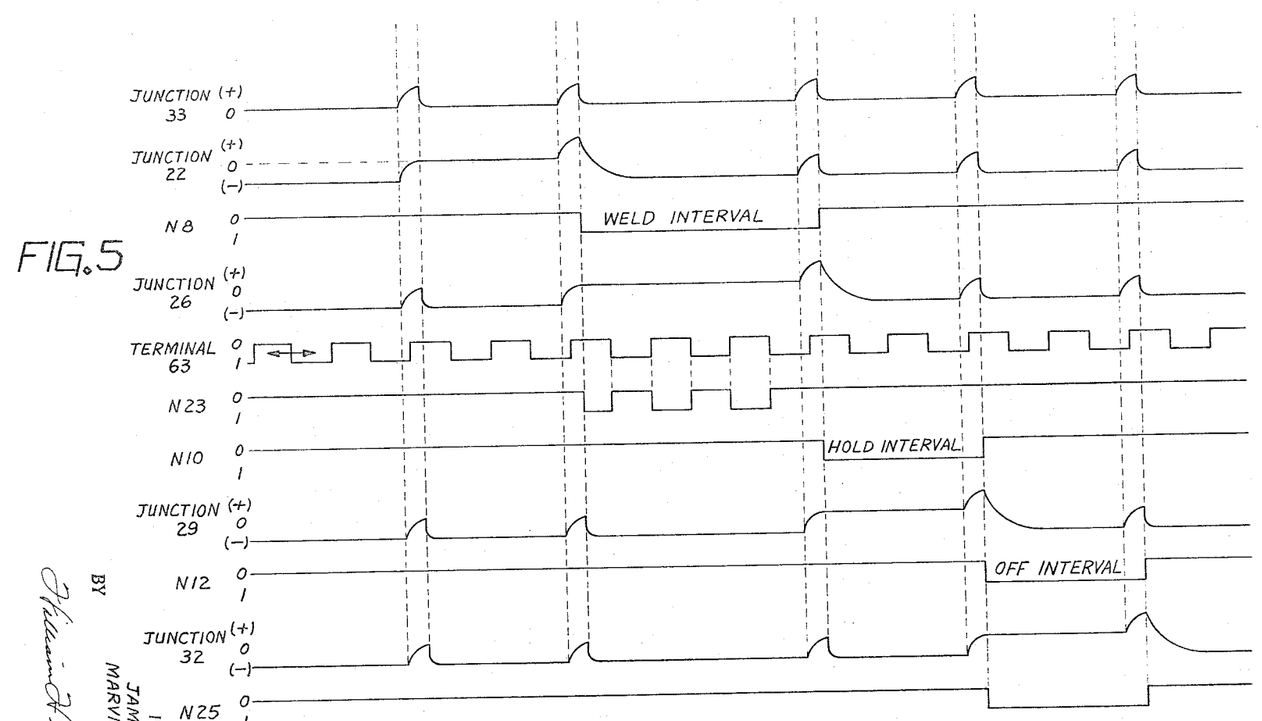

The operation of the circuits in FIGS. 1–3 will now be described in connection with the curves shown in FIGS. 4 and 5 in which the abscissa is represented as time and the ordinates are represented as potentials with reference to the terminal C. In FIGS. 4 and 5 the curve designated as Source S represents the voltage wave of the alternating current source S which energizes the transformer T. The remaining curves in FIGS. 4 and 5 are drawn with reference to particular instants in time with reference to the curve indicated as Source S. The curves designated as N24, N14, N16, N21, N22, N4, N6, N8, N23, N10, N12 and N25 represent the signals at the output terminals of the corresponding NORS shown in FIGS. 1 and 2. In FIGS. 4 and 5, a "0" indicates the output terminal of the designated NOR is at a potential of the terminal C and a "1" indicates the output terminal of the NOR has a potential which approximates the terminal —20 v. D.C. The curves designated as junction 54, junction 36, junction 37, junction 18, the junction 33, the junction 22, the junction 26, junction 63, junction 29 and junction 32 in FIGS. 4 and 5 represent the potentials of the corresponding junctions in FIGS. 1 and 2 relative to the opposite sides of the respective capacitor.

The Source S shown in FIG. 2 energizes the primary winding TP of the transformer T with successive half cycles of alternating polarity current graphically shown by the curve Source S in FIG. 4, wherein the half cycle L2 indicates an interval wherein the terminal L2 has a positive polarity relative to the terminal L1 and the half cycle designated as L1 indicates an itnernal wherein the terminal L1 is positive in polarity to the terminal L2.

The energization of the primary winding TP causes the secondary winding TS to supply an alternating polarity current at the terminals 50 and 51 which corresponds to the curve Source S in FIG. 1. The junction 52, which represents a center tap of the transformer secondary winding TS is connected to the junction 57, the base electrode of the transistor T3, the emitter electrode of the transistor T1 and the terminal C. As previously described, the terminal C is connected to the emitter electrodes of each of the transistors in the NORS of the entire system. The junction 54 is connected through the diodes D29 and D30 to the terminals 50 and 51. The diodes D29 and D30 act as full wave rectifiers and are poled to conduct current from the junction 54 to the terminals 50 and 51 which causes the alternating polarity at the terminals 50 and 51 to appear at the junction 54 as a series negative polarity half cycles each separated by an instant when the potential at the junction 54 is equal to the potential at the terminal C as the potential of the Source S passes through zero as shown by the curve Source S in FIG. 4.

The junction 59 is connected through the capacitor C13 to the terminal 52 and through the adjustable resistor R25 to the terminal 51. The resistor R25 and the capacitor C13 act as a phase shift network to cause a signal to appear at the junction 59 which is shifted in time relative to the potential at the terminals 50 and 51. The junction 59 is connected to an input of the NOR N24 which in response to the signal at the junction 59, as dictated by the adjustment of the resistor R25, supplies an output signal at terminal 60 as shown by curve N24 in FIG. 4. The output signal of the NOR N24, as shown on the curve N24, switches from "0" to "1" at 85° after voltage zero during each L2 half cycle and from "1" to "0" at 85° after voltage zero during each L1 half cycle.

Additionally as shown in FIG. 2, the junction 53 is connected through the capacitor C11 to the terminal 50 and through the series connected adjustable resistors R22 and R23 to the terminal 51. The capacitor C11 and the resistors R22 and R23 cause the potential at the junction 53 to be shifted in phase relative to the alternating polarity at the terminals 50 and 51 an adjustable amount depending on the settings of the adjustable resistors R22 and R23. One of the resistors, e.g., resistor R23, may be used as a fixed adjustment to compensate the system for power factor variations in the welding apparatus as is well known to those skilled in the art. The other resistor, e.g., resistor R22, may be used to vary the phase shift of the potential at the junction 53 an adjustable amount to provide a Heat Control Function for the circuit.

The junction 53 is connected through the resistor R24, and junction 58 and the capacitor C12 to the junction 57. While the resistor R24 and the capacitor C12 will additionally cause a slight shift in time of the potential of the junction 58 relative to the potential at the junction 53, the resistor R24 and the capacitor C12 basically serve as a filter network to suppress transient voltages.

So far as is possible, the transistors T1, T2 and T3 are selected to be identical in their operating characteristics for the purposes which will now be explained. The junction 58 is connected to the emitter electrode of the transistor T3 and the base of the transistor T1. The base of the transistor T3 and the emitter electrode of the transistor T1 are connected to terminal C. The potential at junction 57 appears as an alternating potential relative to the terminal C. Thus during the half cycle when the junction 58 is positive in polarity relative to the terminal C, the transistor T3 will conduct current from its base to emitter electrode. Similarly during the half cycle when the terminal C is positive in polarity relative to the junction 58, the transistor T1 will conduct current through its emitter and base electrodes. Thus as the transistors T1 and T3 are identical in their characteristics, equal amounts of current will be conducted in opposite directions at the junctions 57 and 58 and the capacitor C12 will not build up a charge which would tend to bias the transistors T3 and T1 against symmetrical conduction.

The collector electrode of the transistor T1 is connected through the output terminal 63 and the collector resistor R26 to the terminal −20 v. D.C. Thus during each half cycle when current flows through the emitter to base electrodes of the transistor T1 to the junction 58, the transistor T1 will conduct and supply a "0" signal at the terminal 63. Similarly during the half cycles when the transistor T1 is biased against conduction as current flows from the junction 58 through the emitter to base electrodes of the transistor T3, the terminal 63 will have a "1" signal impressed thereon. However, because inherently the potential between the emitter to base of a transistor must be greater than zero to bias the transistor into conduction, if no additional means were included in circuit with the transistor T1. The time intervals during which the transistor T1 would be nonconductive would be greater than the time intervals during which the transistor would be conductive in response to the alternating polarity at the junction 58. The resistor R27 if properly selected, which is connected between the treminal −20 v. D.C. and the base electrode of the transistor T1, supplies a slight negative bias to cause the periods of nonconduction and the periods of conduction of the transistor T1, in response to the alternating polarity at the junction 58, to be equal. Thus the intervals during which the signals at the terminal 63 will be "0" and "1" will be equal in time.

Further it is well known that the operating characteristics of transistors are variable with changes in temperature and an increase in temperature will cause an increased conduction of the transistor T1 in the circuit shown in FIG. 2. The transistor T2 which has its collector electrode connected to the base of the transistor T1 and its base and emitter electrodes connected through resistors R28 and R29 to the terminal +20 v. D.C., supplies a slight bias in a direction to decrease the conduction of the transistor T1. Thus as the transistors T1 and T2 are selected to have identical characteristics, an increase in temperature which causes an increase in conduction of the transistor T1 will cause a corresponding increase in conduction of the transitsor T2 and thereby compensate the conduction of the transistor T1 for temperature variations.

During the interval when a direct current source, not shown, initially causes the potentials at the terminals +20 v. D.C. and −20 v. D.C. to rise to their designated values relative to the terminal C., the OFF RETURN terminal is supplied with a "1" signal. The "1" off return signal switches the NOR memories of the system so the NORS N4, N6, NB, N10, N12 and N19 have a "0" output signal and the NORS N5, N7, N9, N11, N13 and N18 have a "1" output signal. During standby conditions the initiating switch SW1 has open contacts and the source S is energized so the junction 54 has an output signal which appears as shown by the junction 54 curve in FIG. 4 and the NOR N24 provides an output signal as shown by N24 curve in the FIG. 4, as was previously described.

Further, during a brief time interval when the logic system in FIGS. 1 and 2 is initially energized, the unijunction transistor conducts to charge the capacitor C2 as previously described. During the interval when capacitor C2 is being charged, the junction 37 will have a negative polarity and thus supply a "1" input signal to the NOR N14 which causes the NOR N14 to have a "0" output signal and the NOR N15 to have an output signal of "1" so the capacitor C2 receives its additional charge as previously described.

At 85° after voltage zero during a L2 positive polarity half cycle, the output of the NOR N24 provides a "1" input signal to the NOR N22 which causes the NOR N22 to have a "0" output signal and the NOR N21 to have a "1" output signal.

At 85° after voltage zero during a L1 positive polarity half cycle, the output of NOR N24 becomes "0" which is transmitted as an input to the NOR N16. Also because a slight negative signal is required to make a transistor within a NOR conductive during the brief interval when the potential at junction 54 approaches the potential of terminal C, e.g., 355° of one cycle and 5° during a succeeding cycle, the junction 54 will provide an input to the NOR N16 which is substantially a "0." Also as previously stated, the NOR N14 supplies a "0" signal. Therefore during the interval of 355° −5° on the voltage wave of the source S, all of the inputs to the NOR N16 are "0" and the NOR N16 switches to supply a "1" output signal as an input to the NOR N21. The NOR N21 in response to the "1" input signal switches to provide a "0" output signal as an input to the NOR N22. Thus as both inputs to the NOR N22 are "0," it switches to provide a "1" output signal and the capacitor C10 charges as previously described. At 85° after voltage zero during the subsequent half cycle when the terminal L2 is positive in potential, the NOR N24 supplies a "1" input signal to the NOR N22 which causes the output signals of the NORS N21 and N22 to become "1" and "0" and the capacitor C10 to supply a positive input pulse to cause the NOR N14 to switch and provide a "1" output signal in a manner as previously described.

The NOR N14 is connected with the NOR N15 as a NOR memory so after the switching of the NOR N14 as previously described, during the remainder of the standby period, the NOR N14 supplies a continuous "1" input to the NOR N16 which prevents the NOR N16 from switching in response to the occurrence of "0" signals from junction 54 and the NOR N24.

The charging of the capacitor C3 is accomplished in the same manner as the charging of the capacitor C2. That is, when power was initially applied to the logic system, the unijunction transistor U2 conducts to provide a path for initially charging the capacitor C3 from the terminal C through the resistor R18, the junction C3, the junction 44, the emitter $e$ base $b1$ electrodes to the terminal −20 v. D.C. As previously described, the charging current for the capacitor C2 caused a negative pulse to appear at junction 37 which switched the NOR N14 so the NOR N14 supplied a "0" output signal. A similar negative pulse is produced at the junction 46 when the capacitor C3 charges which causes the NOR N18 to switch and supply a "0" output signal. However, the NOR N19 which is connected with the NOR 18 as a NOR memory, does not switch in response to the "0" output signal of the NOR N18 because the OFF RETURN signal is purposely formed to have a time duration which exceeds the duration of the "1" signal at the junction 46. So that the NOR N19 controls the condition of the NOR memory N18 and N19 and after the signal at the junction 46 disappears, the NOR N18 and N19 respectively will supply "1" and "0" output signals during standby conditions. Additionally, as was previously discussed, during a brief time interval when the logic system is initially energized, the NOR N14 has a "0" output signal. This signal is applied from the terminal 39 as an input to the NOR N17 so that the NOR N17 will have a "1" output signal. The presence of a "1" output signal from the NOR N17 permits the capacitor C3 to charge through the diode D21 after the unijunction transistor U2 ceases to conduct in the same manner as the capacitor C2 was charged through the diode D20 after the unijunction U1 ceased to conduct.

Also as previously pointed out, after capacitor C2 was fully charged, the NOR N14 switches to provide a "1" output signal. This "1" signal is transmitted as an input to the NOR N17 so its output becomes "0" to terminate the charging of the capacitor C3 through the diode D21. After the capacitor C3 is charged and the NOR N17 supplies a "0" output signal, the charge on the capacitor C3 is maintained by a trickle current which flows from the junction 44 through the resistor R33 to the terminal −20 v. D.C.

It will be seen from the foregoing that after the charging of the capacitor C2 has been completed, all of the charging current paths for the capacitor C2 are interrupted. Similarly, during standby conditions, all of the discharge current paths for the capacitor C2 are inoperative. However, in the event of prolonged standby intervals, it is possible for the charge on the capacitor C2 to be dissipated through the leakage paths provided by the semiconductors in the various circuits. To prevent the occurrence of this result a circuit for a trickle charging current is provided by a resistor R34 which has a high resistance value and is connected in parallel circuit with the diode D19. This trickle current path includes the terminal C, the resistor R13, the junction 37, the capacitor C2, the junction 36, the junction 19, the lead 23, the resistor R34, the resistor R10 and the collector circuit of the transistor within the NOR N9 which is nonconducting so the terminal 25 is at the potential of the terminal −20 v. D.C.

Thus in view of the foregoing, during standby conditions after the capacitors C2 and C3 have been charged and the initiating switch SW1 is open, the circuitry in FIGS. 1 and 2 will be conditioned as follows. NORS N1, N3, N4, N6, N8, N10, N12, N15, N16, N17, N19, N22, and N23 will have "0" output signals. The NORS N2, N5, N7, N9, N11, N13, N14, N18, N20, and N21 will have "1" output signals. The NOR N24 will supply signals as appearing on the curve N24. The capacitors C1, C2, C3, and C4 will be charged making the junction 13 positive, the junction 36 negative, the junction 44 negative and the junction 18 negative relative to the junctions on the opposite sides of the respective capacitors. Also as the capacitors C5, C6, C8 and C9 are connected in circuit with the NOR N22 in the same manner as the capacitor C4, the junctions 22, 26, 29 and 32 will have potential which is negative to the opposite sides of the respective capacitors C5, C6, C8 and C9.

The weld sequence is initiated when the contacts of the switch SW1 are closed. As may be appreciated, this will occur at random during any instant of an L1 or L2 half cycle on the voltage wave of the source S curve in FIG. 4. The closure of the switch SW1 causes the output of the NOR N1 to become "1" which causes the NOR memory N2 and N3 to switch so the NOR N2 provides a "0" output signal and the NOR N3 a "1" output signal.

The "1" output signal at the terminal 14 energizes the welder solenoid 15 which causes the electrodes of the resistance welder control to begin movement toward the parts to be welded in a manner well known to those skilled in the art. Similarly, the "1" signal at the terminal 14 causes the NOR N20 to have a "0" output signal, the effect of which is blocked by the diode D1 on the remainder of the logic system.

The change in potential at the junction 13 which accompanies the change in the output signal of the NOR N2 is transmitted as a momentary positive voltage pulse through the diode D1 directly to the base of the transistor within the NOR 4 which in response thereto switches to provide a "1" output signal which causes the transistor within the NOR N5 to conduct and provide a "0" output signal.

The "Squeeze Delay" period begins when the NOR memory including the NOR N4 switches to provide a "1" output signal and the NOR N5 begins conduction to supply a "0" output signal. The conduction of the NOR N5 provides a timed discharge path for the capacitor C2 through a circuit which includes the conducting NOR N5, the resistor R8, and the diode D15, as described in connection with the circuit shown in FIG. 3. The discharge of the capacitor C2 causes the potential at the junction 36 to become more positive in polarity as shown on the junction 36 curve in FIG. 4. When the potential at the junction 36 reaches a predetermined value, the unijunction transistor U1 switches and causes current to flow from its emitter e to the base b1 electrodes which charges the capacitor C2. The charging current for the capacitor C2 causes a negative voltage pulse to appear at the junction 37 which causes the NOR N14 to switch and supply a "0" output signal. It is to be noted that this signal may occur at random. However, if the setting of the resistor R8 is adjusted so that under optimum conditions the switching of the NOR N14 occurs at the point where the voltage of the Source S passes through a "0" between L2 and L1 polarity half cycle, a minimum variation in the duration of squeeze delay periods will be obtained. The switching of the NOR N14 causes the NOR N15 to similarly switch and supply a "1" signal to the NOR N14 so that the memory is maintained in a condition whereby NOR N14 continues to supply a "0" output signal. This "0" output signal is transmitted as an input to the NOR N16 so that the NOR N16 is exclusively controlled by the signals present at the junction 54 and the output of the NOR N24. As clearly shown on the curves in FIG. 4, at 85° during an L1 half cycle the output of the NOR N24 switches to "0." Subsequently, at 355° during the same L1 half cycle, the NOR N16 receives an effective "0" signal from the junction 54. Thus as all of the inputs to the NOR N16 are "0," the NOR N16 switches to provide a momentary "1" signal pulse which exists until 5° of the subsequent L2 half cycle. The momentary signal "1" pulse from the NOR N16 is transmitted as an input through the lead 55 to the NOR N21 which in response thereto switches to provide a "0" output signal. The "0" output signal of the NOR N21 is transmitted as an input to the NOR N22 which in response thereto switches to provide a "1" output signal.

It should be noted that during the interval when the NORS N5 and N22 are conducting, the capacitor C4 discharges and the potential at the junction 18 approaches potential at the terminal C. However, during the interval when the NOR N5 is conducting and the NOR N 22 is switched to its nonconductive state, the capacitor C4 begins to charge making the junction 18 positive in polarity relative to the terminal 42. Further as previously explained, after the initial charging of the capacitor C2 by the unijunction transistor U1, the capacitor C2 is additionally charged through the diode D20 as the NOR N15 is nonconducting as described in connection with the circuitry shown in FIG. 3. Further, when the NOR N22 is switched to its nonconductive state to supply a "1" output signal, the capacitor C10 charges from the terminal C through the resistor R31 making the diode 22 side of the capacitor C10 positive in polarity relative to the junction 33.

At 85° after voltage zero during the subsequent L2 polarity, a signal at the junction 59 causes the NOR N24 to provide a "1" output signal which is transmitted through the lead 61 as an input to the NOR N22. The NOR N22 switches in response to the "1" input signal and provides a "0" output signal which causes the NOR N21 to have a "1" output signal. The "0" output signal from the NOR N22 causes the charge on the capacitor C10 to appear as a positive voltage pulse which is delievered directly as an input to the NOR N14 so that the NOR N14 switches to provide a "1" output signal to thereby prevent further switching of the NOR N16. Additionally, the switching of the output signal from the NOR N22 to a "0" which is delivered through the junction 33 and the lead 27a causes the positive charge on the capacitor C4 to be delievered through diodes D5 and D6 directly to the inputs of the NORS N5 and N6. It is to be noted that while the NOR N6 is not shown in FIG. 3, the arrow 70 in each of the FIGS. 1 and 3 represents the connection of the junction 18 through the diode D6 to an input of the NOR N6 in a manner similar to the connection with the input to the NOR N5 through the diode D5 in FIG. 3. The positive voltage pulse which is provided by the capacitor C4 causes the NORS N5 and N6 both to switch to a nonconducting state so that each supply a "1" output signal. The "1" output signal from the NOR N5 is transmitted as an input to the NOR N4 so that the NOR N4 switches to provide a "0" output signal. Thus the NORS N4 and N5 are both switched and provide the same output signals as they provided during standby conditions and the Squeeze Delay interval is thereby terminated.

The "1" output signal of the NOR N6 causes the NOR N7 to switch to its conductive state and provides a "0" output signal which starts the beginning of the interval known as the "Squeeze" interval. The conduction of the NOR N7 provides a timed discharge path for the capacitor C2 through a circuit which includes the conducting NOR N7, the resistor R9, and the diode D16, as described in connection with the circuit shown in FIG. 3. The discharge of the capacitor C2 causes the potential at the junction 36 to become more positive in polarity as shown on the junction 36 curve in FIG. 4. When the potential at the junction 36 reaches a predetermined value, the unijunction transistor U1 switches and causes current to flow from its emitter $e$ to the base $b1$ electrodes which charge the capacitor C2. The charging current for the capacitor C2 causes a negative voltage pulse to appear at the junction 37 which causes the NOR N14 to switch and supply a "0" output signal. It is to be noted that this signal may occur at random. However, if the setting of the resistor R9 is adjusted so that under optimum conditions the switching of the NOR N14 occurs at the point where the voltage of the Source S passes through "0" between L2 and L1 polarity half cycles, a minimum variation in the duration of Squeeze periods will be obtained. The switching of the NOR N14 causes the NOR N15 to similarly switch and supply a "1" signal to the NOR N14 so that the memory is maintained in a condition whereby NOR N14 continues to supply a "0" output signal. This "0" output signal is transmitted as an input to the NOR N16 so that the NOR N16 is exclusively controlled by the signals present at the junction 54 and the output of the NOR N24. As clearly shown on the curves in FIG. 4, at 85° during an L1 half cycle the ouput of the NOR N24 switches to "0." Subsequently, at 355° during the same L1 half cycle, the NOR N16 receives an effective "0" signal from the junction 54. Thus as all of the inputs to the NOR N16 are "0," the NOR N16 switches to provide a momentary "1" signal pulse which exists until 5° of the subsequent L2 half cycle. The momentary signal "1" pulse from the NOR N16 is transmitted as an input through the lead 55 to the NOR N21 which in response thereto switches to provide a "0" output signal. The "0" output signal of the NOR N21 is transmitted as an input to the NOR N22 which in response thereto switches to provide a "1" output signal.

It should be noted that during the interval when the NORS N7 and N22 are conducting, the capacitor C5 discharges and the potential at the junction 22 approaches the potential at the terminal C. However, during the interval when the NOR N7 is conducting and the NOR N22 is switched to its nonconductive state, the capacitor C5 begins to charge making the junction 22 positive in polarity relative to the terminal 42. Further as previously explained, after the initial charging of the capacitor C2 by the unijunction transistor U1, the capacitor C2 is additionally charged through the diode D20 as the NOR N15 is nonconducting as described in connection with the circuitry shown in FIG. 3. Further, when the NOR N22 is switched to its nonconductive state to supply a "1" output signal, the capacitor C10 charges from the terminal C through the resistor R31 making the diode 22 side of the capacitor C10 positive in polarity relative to the junction 33.

At 85° after voltage zero during the subsequent L2 polarity, a signal at the junction 59 causes the NOR N24 to provide a "1" output signal which is transmitted through the lead 61 as an input to the NOR N2. The NOR N22 switches in response to the "1" input signal and provides a "0" output signal which causes the NOR N21 to have a "1" output signal. The "0" output signal from the NOR N22 causes the charge on the capacitor C10 to appear as a positive voltage pulse which is delivered directly as an input to the NOR N14 so that the NOR N14 switches to provide a "1" output signal to thereby prevent further switching of the NOR N16. Additionally, the switching of the output signal from the NOR N22 to a "0" output signal which is delivered through the junction 33 and the lead 27a causes the positive charge on the capacitor C5 to be delivered through diodes D7 and D8 directly to the inputs of the NORS N7 and N8, so that the NORS N7 and N8 switch in response to the signal pulse from the capacitor C5 in the same manner as the NORS N5 and N6 switched in response to the signal pulse from the capacitor C4. The positive voltage pulse which is provided by the capacitor C5 causes the NORS N7 and N8 both to switch to a nonconducting state so that each supply a "1" output signal. The "1" output signal from the NOR N7 is transmitted as an input to the NOR N6 so that the NOR N6 switches to provide a "0" output signal. Thus the NORS N6 and N7 are both switched and provide the same output signals as they provided during standby conditions and the "Squeeze" interval is thereby terminated.

The "1" output signal of the NOR N8 causes the NOR N9 to switch to its conductive state and provide a "0" output signal which starts by the beginning of the interval known as the "Weld Interval." The conduction of the NOR N9 provides a timed discharged path for the capacitor C2 through a circuit which includes the conducting NOR N9, the resistor R10, and the diode D19, as described in connection with the circuit shown in FIG. 3. The discharge of the capacitor C2 causes the potential at the junction 36 to become more positive in polarity as shown on the junction 36 curve in FIG. 4. When the potential at the junction 36 reaches a predetermined value, the unijunction transistor U1 switches and causes current to flow from its emitter $e$ to the base $b1$ electrodes which charges the capacitor C2. The charging current for the capacitor C22 causes a negative voltage pulse to appear at the junction 37 which causes the NOR N14 to switch and supply a "0" output signal. It is to be noted that this signal may occur at random. However, if the setting of the resistor R10 is adjusted so that under optimum conditions the switching of the NOR N14 occurs at the point where the voltage of the Source S passes through a "0" between L2 and L1 polarity half cycles, a minimum variation in the duration of Weld period will be obtained. The switching of the NOR N14 causes the NOR N15 to similarly switch and supply a "1" signal to the NOR N14 so that the memory is maintained in a condition whereby NOR N14 continues to supply a "0" output signal. This "0" output signal is transmitted as an input to the NOR N16 so that the NOR N16 is exclusively controlled by the signals present at the junction 54 and the output of the NOR N24. As clearly shown on the curves in FIG. 4, at 85° during a L1 half cycle the output of the NOR N24 switches to "0." Subsequently, at 355° during the same L1 half cycle, the NOR N16 receives an effective "0" signal from the junction 54. Thus as all of the inputs to the NOR N16 are "0," the NOR N16 switches to provide a momentary "1" signal pulse which exists until 5° of the subsequent L2 half cycle. The momentary signal "1" pulse from the NOR N16 is transmitted as an input through the lead 55 to the NOR N21 which in response thereto switches to provide a "0" output signal. The "0" output signal of the NOR N21 is transmitted as an input to the NOR N22 which in response thereto switches to provide a "1" output signal.

It should be noted that during the interval when the NORS N9 and N22 are conducting, the capacitor C6 discharges and the potential at the junction 26 approaches the potential at the terminal C. However, during the interval when the NOR N9 is conducting and the NOR N22 is switched to its nonconductive state, the capacitor C6 begins to charge making the junction 26 positive in polarity relative to the terminal 42. Further as previously explained, after the initial charging of the capacitor C2 by the unijunction transistor U1, the capacitor C22 is additionally charged through the diode D20 as the NOR N15 is nonconducting as described in connection with the circuitry shown in FIG. 3. Further, when the NOR N22 is switched to its nonconductive state to supply a "1" output signal, the capacitor C10 charges from the terminal C through the resistor R31 making the diode D22 side of the capacitor C10 positive in polarity relative to the junction 33.

At 85° after voltage zero during the subsequent L2 polarity, a signal at the junction 59 causes the NOR N24 to provide a "1" output signal which is transmitted through the lead 61 as an input to the NOR N22. The NOR N22 switches in response to the "1" input signal and provides a "0" output signal which causes the NOR N21 to have a "1" output signal. The "0" output signal from the NOR N22 causes the charge on the capacitor C10 to appear as a positive voltage pulse which is delivered directly as an input to the NOR N14 so that the NOR N14 switches to provide a "1" output signal to thereby prevent further switching of the NOR N16. Additionally, the switching of the output signal from the NOR N22 to a "0" which is delivered through the junction 33 and the lead 27a causes the positive charge on the capacitor C6 to be delivered through diodes D9 and D10 directly to the inputs of the NORS N9 and N10 so that the NORS N9 and N10 switch in response to the signal pulses from the capacitor C6 in the same manner as the NORS N5 and N6 switch in response to the signal pulse from the capacitor C4. The positive voltage pulse which is provided C6 causes the NORS N9 and N10 both to switch to a nonconducting state so that each supply a "1" output signal. The "1" output signal from the NOR N9 is transmitted as an input to the NOR N8 so that the NOR N8 switches to provide a "0" output signal. Thus the NORS N8 and N9 are both switched and provide the same output signals as they provided during standby conditions and the "Weld Interval" is thereby terminated.

The "1" output signal of the NOR N10 causes the NOR N11 to switch to its conductive state and provide a "0" output signal which starts the beginning of the interval known as the "Hold" interval. The conduction of the NOR N11 provides a timed discharge path for the capacitor C2 through a circuit which includes the conducting NOR N11, the resistor R11, and the diode D18, as described in connection with the circuit shown in FIG. 3. The discharge of the capacitor C2 causes the potential at the junction 36 to become more positive in polarity as shown on the junction 36 curve in FIG. 4. When the potential at the junction 36 reaches a predetermined value, the unijunction transistor U1 switches and causes current to flow from its emitter $e$ to the base $b1$ electrodes which charges the capacitor C2. The charging current for the capacitor C2 causes a negative voltage pulse to appear at the junction 37 which causes the NOR N14 to switch and supply a "0" output signal. It is to be noted that this signal may occur at random. However, if the setting of the resistor R11 is adjusted so that under optimum conditions the switching of the NOR N14 occurs at the point where the voltage of the Source S passes through a "0" between L2 and L1 polarity half cycles, a minimum variation in the duration of Hold periods will be obtained. The switching of the NOR N14 causes the NOR N15 to similarly switch and supply a "1" signal to the NOR N14 so that the memory is maintained in a condition whereby NOR N14 continues to supply a "0" output signal. This "0" output signal is transmitted as an input to the NOR N16 so that the NOR N16 is exclusively controlled by the signals present at the junction 54 and the output of the NOR N24. As clearly shown on the curves in FIG. 4, at 85° during a L1 half cycle the output of the NOR N24 switches to "0." Subsequently, at 355° during the same L1 half cycle, the NOR N16 receives an effective "0" signal from the junction 54. Thus as all of the inputs to the NOR N16 are "0," the NOR N16 switches to provide a momentary "1" signal pulse which exists until 5° of the subsequent L2 half cycle. The momentary signal "1" pulse from the NOR N16 is transmitted as an input through the lead 55 to the NOR N21 which in response thereto switches to provide a "0" output signal. The "0" output signal of the NOR N21 is transmitted as an input to the NOR N22 which in response thereto switches to provide a "1" output signal.

It should be noted that during the interval when the NORS N11 and N22 are conducting, the capacitor C8 discharges and the potential at the junction 29 approaches the potential at the terminal C. However, during the interval when the NOR N11 is conducting and the NOR N22 is switched to its nonconductive state, the capacitor C8 begins to charge making the junction 29 positive in polarity relative to the terminal 42. Further as previously explained, after the initial charging of the capacitor C2 by the unijunction transistor U1, the capacitor C2 is additionally charged through the diode D20 as the NOR N15 is nonconducting as described in connection with the circuitry shown in FIG. 3. Further, when the NOR N22 is switched to its nonconductive state to supply a "1" output signal, the capacitor C10 charges from the terminal C through the resistor R31 making the diode D22 side of the capacitor C10 positive in polarity relative to the junction 33.

At 85° after voltage zero during the subsequent L2 polarity, a signal at the junction 59 causes the NOR N24 to provide a "1" output signal which is transmitted through the lead 61 as an input to the NOR N22. The NOR N22 switches in response to the "1" input signal and provides a "0" output signal which causes the NOR N21 to have a "1" output signal. The "0" output signal from the NOR N22 causes the charge on the capacitor C10 to appear as a positive voltage pulse which is delivered directly as an input to the NOR N14 so that the NOR N14 switches to provide a "1" output signal to thereby prevent further switching of the NOR N16. Additionally, the switching of the output signal from the NOR N22 to a "0" output signal which is delivered through the junction 33 and the lead 27a causes the positive charge on the capacitor C8 to be delivered through diodes D11 and D12 directly to the inputs of the NORS N11 and N12 so that the NORS N11 and N12 switch in response to the signal pulse from the capacitor C11 in the same manner as the NORS N5 and N6 switched in response to the signal pulse from the capacitor C4. The positive voltage pulse which is provided by the capacitor C11 causes the NORS N11 and N12 both to switch to a nonconducting state so that each supply a "1" output signal. The "1" output signal from the NOR N11 is transmitted as an input to the NOR N10 so that the NOR N10 switches to provide a "0" output signal. Thus the NORS N10 and N11 are both switched and provide the same output signals as they provided during standby conditions and the "Hold Interval" is thereby terminated.

The "1" output signal of the NOR N12 causes the NOR N13 to switch to its conductive state and provide a "0" output signal which starts the beginning of the interval known as the "OFF Period." The conduction of the NOR N13 provides a timed discharge path for the capacitor C2 through a circuit which includes the conducting NOR N13, the resistor R12, and the diode D17, as described in connection with the circuit shown in FIG. 3. The discharge of the capacitor C2 causes the potential at the junction 36 to become more positive in polarity as shown on the junction 36 curve in FIG. 4. When the potential at the junction 36 reaches a predetermined value, the unijunction transistor U1 switches and causes current to flow from its emitter $e$ to the base $b1$ electrodes which charges the capacitor C2. The charging current for the capacitor C2 causes a negative voltage pulse to appear at the junction 37 which causes the NOR N14 to switch and supply a "0" output signal. It is to be noted that this signal may occur at random. However, if the setting of the resistor R12 is adjusted so that under optimum conditions the switching of the NOR N14 occurs at the point where the voltage of the Source S passes through a "0" between L2 and L1 polarity half cycles, a minimum variation in the duration of OFF periods will be obtained. The switching of the NOR N14 causes the NOR N15 to similarly switch and supply a "1" signal to the NOR N14 so that the memory is maintained in a condition whereby NOR N14 continues to supply a "0" output signal. This "0" output signal is transmitted as an input to the NOR N16 so that the NOR N16 is exclusively controlled by the signals present at the junction 54 and the output of the NOR N24. As clearly shown on the curves in FIG. 4, at 85° during a L1 half cycle the output of the NOR N24 switches to "0." Subsequently, at 355° during the same L1 half cycle, the NOR N16 receives an effective "0" signal from the junction 54. Thus as all of the inputs to the NOR N16 are "0," the NOR N16 switches to provide a momentary "1" signal pulse which exists until 5° of the subsequent L2 half cycle. The momentary signal "1" pulse from the NOR N16 is transmitted as an input through the lead 55 to the NOR N21 which in response thereto switches to provide a "0" output signal. The "0" output signal of the NOR N21 is transmitted as an input to the NOR N22 which in response thereto switches to provide a "1" output signal.

It should be noted that during the interval when the NORS N13 and N22 are conducting, the capacitor C9 discharges and the potential at the junction 32 approaches the potential at the terminal C. However, during the interval when the NOR N13 is conducting and the NOR N22 is switched to its nonconductive state, the capacitor C9 begins to charge making the junction 32 positive in polarity relative to the terminal 42. Further as previously explained, after the initial charging of the capacitor C2 by the unijunction transistor U1, the capacitor C2 is additionally charged through the diode D20 as the NOR N15 is nonconducting as described in connection with the circuitry shown in FIG. 3. Further, when the NOR N22 is switched to its nonconductive state to supply a "1" output signal, the capacitor C10 charges from the terminal C through the resistor R31 making the diode D22 side of the capacitor C10 positive in polarity relative to the junction 33.

At 85° after voltage zero during the subsequent L2 polarity, a signal at the junction 59 causes the NOR N24 to provide a "1" output signal which is transmitted through the lead 61 as an input to the NOR N22. The NOR N22 switches in response to the "1" input signal and provides a "0" output signal which causes the NOR N21 to have a "1" output signal. The "0" output signal from the NOR N22 causes the charge on the capacitor C10 to appear as a positive voltage pulse which is delivered directly as an input to the NOR N14 so that the NOR N14 switches to provide a "1" output signal to thereby prevent further switching of the NOR N16. If the switches SW1 and SW2 both are in a circuit making position, the switching of the output signal from the NOR N22 to a "0" output signal which is delivered through the junction 33 and the lead 27a causes the positive charge on the capacitor C9 to be delivered through diodes D14 and D13 directly to the inputs of the NORS N6 and N13 so that the NORS N6 and N13 switch in response to the signal pulse from the capacitor C9 in the same manner as the NORS N5 and N6 switches in response to the signal pulse from the capacitor C4. The positive voltage pulse which is provided by the capacitor C9 causes the NORS N6 and N13 both to switch to a nonconducting state so that each supply a "1" output signal. The "1" output signal from the NOR N6 is transmitted as an input to the NOR N7 so that the NOR N6 switches to provide a "0" output signal. Thus the NORS N12 and N13 are both switched and provide the same output signals as they provided during standby conditions and the "OFF Period" is thereby terminated.

During the Squeeze Delay, Squeeze, Weld and Hold intervals the NORS N4, N6, N8 and N10 sequentially provide a "1" signal at terminals 16, 20, 24 and 27. These "1" signals are supplied as an input to the NOR N25 thereby maintaining the output signal of the NOR N25 as a continuous "0." Also during all periods except the OFF Period, the NOR N12 provides a "0" output signal to terminal 30 which is connected to the NOR N20. During the OFF period the signal at terminal 30 changes from "0" to "1" which is effective to switch the NOR N20. If the initiating switch SW1 is opened after a Weld sequence is initated the output of the NOR N1 becomes "0." However, the NOR memory consisting of NORS N2 and N3 does not switch in response to the opening of the initiating switch as the NOR N25 output signal is "0" during the Squeeze Delay, Squeeze, Weld and Hold periods. In the event that the initiating switch is open and the circuit is sequenced to time the OFF period, the output of the NOR N25 switches and becomes "1," thereby causing the NOR N3 to switch to provide a "0" output signal to NOR N2 and to the NOR N20. The NOR memory, consisting of the NORS N2 and N3, thereby switches to cause the capacitor C1 to become charged as previously set forth so as to condition the logic system for another weld sequence which is initiated upon closing of the switch SW1. However, during the "OFF Period," the output of the NOR N20 remains "0" as the "1" signal at the terminal 30 prevents the NOR N20 from switching to provide a "1" signal which through the diode D1 would reset all of the NOR memories of the shift register.

In the event the initiating switch SW1 is closed at the end of the Weld sequence and the repeat-non repeat switch SW2 is open, at the end of the Hold interval the NOR N25 will supply a "1" signal to the NOR N3. Under these conditions the NOR N2 receives a "1" signal from the NOR N1 and the NOR N3 receives a "1" signal from the NOR N25. Thus both NORS N2 and N3 of the NOR memory each receive a "1" input signal and the output of the NOR N3 changes and becomes "0" while the output of the NOR N2 remains "0." The "0" output signal from the NOR N3 is transmitted to the welder solenoid which causes separation of the welder electrodes. However, during the OFF period the NOR N12 provides a "1" signal to the NOR N20 so that in spite of the signal change to "0" from NOR N3, the NOR N20's output signal remains "0" to prevent the transmission of a reset signal through the diode D1. As long as the initiating switch SW1 closed the output of the NOR N2 is "0" and the capacitor C1 is not charged. Therefore to initiate another weld sequence the initiating switch must be opened to recharge the capacitor C1 and then reclosed.

If the initiating switch SW1 is closed and the repeat-non repeat switch SW2 is closed at the end of the OFF period, the charge on the capacitor C9 is transmitted as a positive voltage pulse through the diode D14 and the closed switch SW2 directly as an input to the NOR N6. The NOR N6 in response to the positive input switches to provide a "1" output signal to begin the "Squeeze Period" which is sequentially followed by the Weld Period, Hold Period and Off Period, as above described. It is to be noted that when the switch SW2 is closed the shift register is sequenced so as to eliminate the Squeeze Delay Period.

It will be seen from the curve on FIG. 4 that prior to the termination of each of the operations, the signal which includes the Squeeze Delay Period, the Squeeze Period, the Weld Period, the Hold Period and the Off Period, the output of the NOR N14 becomes "0." This output signal is transmitted as an input to the NOR N17 which in response thereto provides a "1" output signal to thereby cause the capacitor C3 to be fully charged and thereby prevent the conduction of the transistor U2. In the event that any of the periods sequenced by the logic circuit should exceed a predetermined time value as dictated by the discharge path of the capacitor C3, the charge on the capacitor C3 will cause the unijunction transistor U2 to conduct and provide an output signal in the same manner as the discharge of the capacitor C2 provided an output signal when the unijunction transistor U1 switched to its conductive state. The discharge path for the capacitor C3 includes the resistor R18, the terminal C, and any one of the conducting NOR circuits N7, N9 and N11 and the diodes D25, D26 and D27 which are connected in circuit with the NORS N7, N9 and N11 and resistor R21 which is connected to the junction 44. When the capacitor C3 provides a signal at the terminal 46, which consists of a sharp negative voltage pulse, the transistor N18 switches to provide a "0" output signal. The "0" output signal of the NOR N18 is transmitted as an input to the NOR N19 which is connected with the NOR N18 as a NOR memory and in response thereto switches and provides a "1" output signal at the terminal 48. The "1" output signal of the NOR N19 is transmitted as an input to the NOR N3 which in response thereto switches to provide a "0" output signal to the NOR N20. During all periods with the exception of the OFF Period, the NOR N20 receives a "0" signal from the NOR N12. Therefore as the NOR N20 receives continuing "0" signals at both of its inputs, its output switches to become a "1" signal which through diode D1 resets all of the NOR memories of the shift register which includes the NORS N4, N6, N8, N10 and N12. Also the "1" signals from terminal 48 maintains the memories N2 and N3 so that the NOR N3 continues to supply a "0" signal. Thus the entire system is locked in an inoperative condition and the only way in which it can be returned to standby conditions for further operation is to release the initiating switch SW1 and to de-energize and re-energize the logic system so an OFF return signal is supplied to the NOR N19 so that its output again becomes "0."

When the output signals of the NORS N22 and N9 switch to "0" at 85° during an L2 positive polarity half cycle the Weld Interval begins. The output "0" signal at the terminal 25 from the NOR N9 is transmitted by the lead 65 as an input to the NOR N23. Similarly, the output "0" signal at the terminal 42 is transmitted by the lead 64 as an input to the NOR N23. Thus as during all intervals other than the "Weld Intervals," the NOR N9 supplies a "1" signal to the NOR N23 and the only time the NOR N23 can switch is during the "Weld Interval." Further, as the switching of the NOR N9 is initiated only at 85° after voltage zero during a positive L2 polarity half cycle, the switching of the NOR N23 cannot occur before 85° during an L2 half cycle.

After the NORS N9 and N22 are thus switched to provide "0" input signals to the NOR N23, the switching of the NOR N23 is exclusively controlled by the output signal from the junction 63. As shown in FIG. 5, the output signal from the junction 63 changes from a "1" to a "0" during an L2 half cycle and from a "0" to a "1" during a L1 half cycle. The instants of change of the signal at the junction 63 is controlled by the adjustment of the resistor R23 which together with the circuit components previously described provide the Heat Control Function for the circuit so that the change may be made to occur prior to or subsequent to 85° during the respective L2 and L1 half cycles. This Heat Control adjustment is represented by the arrow on the terminal 63 curve in FIG. 5.

In FIG. 5, the change in the signal from "1" to "0" is shown as occurring prior to 85° of an L2 half cycle. Thus the NOR N23 is in condition to switch at 85° during an L2 half cycle when the output signals of the NORS N9 and N22 change to "0." It is to be understood that if the resistor R23 is adjusted so the signal at the junction 63 changes to "0" subsequent to 85° during an L2 half cycle, then the NOR N23 will not switch with the change in the output signals of the NORS N9 and N22 to a "0" but when the signal at the junction 63 becomes "0."

The junction 63 supplies a series of "0" and "1" signals to the NOR N23 as is shown on the curve terminal 63 in FIG. 5. The NOR N23 in response to the change "0" to "1" signals provides a complementary output signal and provides an output signal which changes from "0" to "1" during an L1 polarity and from "1" to "0" during an L2 polarity. The weld firing panel, as disclosed in the Meyer application supra, in response to the change in signal from the NOR N23 controls the flow of current through the primary winding of the welder transformer and through suitable means causes welding current to flow when the signal change of "0" to "1" occurs during an L2 half cycle, and the current to flow when the signal changes from "1" to "0" during an L1 half cycle. As shown by the junction 63 curve in FIG. 5, during the later part of an L1 half cycle, the junction 63 provides a "1" signal. At the end of the Weld Interval at 355° during an L1 half cycle, the output of the NOR N22 becomes "1" and continues as "1" until 85° of an L2 half cycle. Thus at the end of the Weld interval the "1" output signal from the junction 63 and from the NOR N22 prevents the NOR N23 from switching. At 85° during an L2 half cycle when the NOR N22 output signal again becomes "0," the output of the NOR N9 switches and becomes a continuous "1" so as to prevent the NOR N23 from firing. Thus the NOR N23 is assured of providing an equal number of signal changes from "0" to "1" and "1" to "0" so as to cause an equal number of L1 and L2 half cycles of welding current flow through the welding transformer. This arrangement is termed "Lead-Trail" firing and prevents magnetic saturation of the welding transformer.

If desired, the logic system shown in FIG. 1 may also include a provision for providing zero hold time. The zero hold time circuit includes the switch SW3 which is connected between the output of the NOR N21 at the terminal 41 and one side of a capacitor C7. The capacitor C7 has its other side connected through a junction 43 and diodes D23 and D24 directly to the inputs of the NOR N9 and N10. When the switch SW3 contacts are closed to complete the circuit between the terminal 41 and the capacitor C7, the zero hold circuit is operative. As was previously pointed out, at 85° during an L2 half cycle, the output of the NOR N21 becomes "1" and the output of the NOR N9 becomes "0." This arrangement will provide a charging path for the capacitor C7 which makes the junction 43 side thereof positive in polarity relative to the switch SW3 side. The charge on the capacitor C7 is maintained throughout the Weld interval. At 355° during an L1 polarity just prior to the end of the Weld interval, the output of the NOR N21 changes to a "0" output. The change to a "0" signal from the NOR N21 causes the charge on the capacitor C7 to be conducted as a positive voltage pulse by the diodes D23 and D24 directly to the bases of the transistors within the NOR N9 and N10 so that the logic system is switched at 355° of an L1 half cycle to the state resembling the Hold Period which was previously described. During the interval from 355° to 85° in the subsequent L2 half cycle, the capacitor C8 charges because the NOR N11 is now conducting and providing a "0" output signal and the NOR N22 is nonconductive and supplying a "1" signal. The charge on the capacitor C8 is in a direction making the junction 29 side thereof positive relative to the lead 27a side thereof. At 85° the NOR N22 is again switched by the signal from the NOR N24 so that its output becomes "0" and causes the charge on the capacitor C8 to appear as a positive pulse to switch the NORS N11 and N12 to the condition represented by the OFF Period as previously described. Thus the system as described provides a false Hold Period which exists during the brief interval between 355° of a L1 half cycle and 85° in the subsequent L2 half cycle so that the logic system essentially is sequenced directly from the Weld Interval to the OFF Interval. In this connection it should be noted that the foregoing does not change the character of the welding current flow through the welder transformer. The charging of the capacitors C7 and C8 and the switching of the NORS N3–N12 occurs during the interval when the terminal 63 provides a "1" signal to the NOR N23 and therefore the welding current flow is not influenced when the zero hold feature is incorporated into the circuit.

It is to be appreciated that the curves shown in FIGS. 4 and 5 are for illustrative purposes only and do not represent actual curves which might be obtained by an oscilloscope. Further, the foregoing described circuit may be utilized to control the sequence and time duration of operations other than those used in a resistance welder.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a controller for sequencing and timing a plurality of separate operations, the combination comprising: a shift register having a plurality of individual stages equal in number to the number of operations to be sequenced with each stage having two stable conditions of operation and switchable from one condition to the other of the two conditions in response to an input signal and from the other condition to the said one condition in response to an input signal, means for supplying each stage with an input signal for causing each stage to be in the said one condition, a single timing capacitor, a plurality of separate circuits each including one of the stages and an adjustable impedance, said separate circuits being connected in circuit with the timing capacitor for controlling the rate of change of a charge across the timing capacitor when any of the stages are in the said other condition, circuit means for impressing a charge on the capacitor, means for applying an input to a stage controlling the first of said sequence of operations for switching said first stage from said one condition to the said other condition to provide a path for changing the charge on the timing capacitor for timing the first of said sequence of operations, means responsive to a predetermined charge across the capacitor for supplying an output signal when the charge on the capacitor changes to a predetermined value, and means responsive to the output signal and coupling each stage with an adjacent stage for supplying a stepping signal as an input signal to the stages for switching any stage from the said other condition to the said one condition and for switching any stage in the sequence immediately succeeding a stage which is switched by the stepping signal from the said one condition to the said other condition whereby the stage controlling the first of said operations is switched to the said one condition while a stage controlling a second of the sequence of operations in the sequence is switched from the said one condition to the said other condition to provide a path for varying the charge across the timing capacitor for controlling the timing of the second operation in the sequence of operations.

2. The combination as recited in claim 1 wherein the coupling means which is connected to a stage controlling the last of said sequence of operations is also connected to the stage controlling the second of said sequence of operations for causing the stage controlling the last of said sequence of operations to switch from the said other condition to the said one condition while the stage controlling the second of said sequence of operations is switched from the said one condition to the said other condition.

3. The combination as recited in claim 1 which includes a second timing capacitor, a means for charging the second timing capacitor, an impedance connected in circuit with each of the stages and the second capacitor, said impedance having a value greater than the impedances in the first mentioned separate circuits for providing a slower rate of change of the charge across the second timing capacitor than the rate of change of the charge across the first mentioned timing capacitor when any of the stages are switched to the said other condition, a means responsive to a predetermined charge on the second timing capacitor for providing an output pulse when the charge across the second timing capacitor reaches the predetermined value, and a means for switching each of the stages to the said one condition in response to the output pulse.

4. A system for sequencing and controlling the duration of a plurality of separate operations, comprising: a shift register having a plurality of stages of transistor pairs equal in number to the number of operations to be sequenced, means for coupling the transistors of each pair together so as to form a flip-flop circuit with each transistor of a pair having two stable conditions of operation, one in which it is conducting and one in which it is nonconducting including means responsive to the shifting of one transistor from one condition to the other condition to cause the other transistor to shift its condition so the transistors of each pair are switched to opposite conditions, means for applying an operational pulse simultaneously to each of said stages to cause one of the transistors in each pair to be conducting and the other transistor of each pair to be nonconducting, a single timing capacitor, circuit means for impressing a charge on the capacitor, a plurality of separate discharge circuits for the timing capacitor, each of said discharge circuits including an impedance and one of the said other transistors of each stage for discharging the timing capacitor through any of the said other transistors which is in a conducting condition, means for applying a signal to a stage controlling the first of said sequence of operations for causing the said other transistor in said stage to switch to its conducting condition for discharging the timing capacitor through the impedance in circuit therewith at a rate determined by the value of said impedance, means responsive to the charge on the timing capacitor for supplying an output signal change when the charge on the timing capacitor is reduced to a predetermined value, and means responsive to the output signal change coupling each stage with an adjacent stage for supplying a switching signal for switching the said other transistor in any of stages from its conducting to its nonconducting condition and for switching the said one transistor in any stage controlling an operation in the sequence immediately succeeding a stage having a said other transistor in its conducting condition from a conducting to a nonconducting condition.

5. A controller for timing and sequencing the operations of a resistance welder comprising: a shift register having a plurality of separate stages equal in number to the number of operations to be timed by the controller, each of said stages being switchable between two stable conditions of operation, means for switching all of the stages to one of said two conditions of operation, means for switching the stages sequentially from the said one condition of operation to the other of the said two conditions of operation, a single timing capacitor, means for impressing a predetermined charge on the capacitor, a plurality of separate circuits each including one of the stages and a adjustable resistor, said separate circuit each providing a discharge circuit for the charge on the capacitor when the stage in said discharge circuit is in the other of said two conditions for timing the operation sequences by the stage in said other condition, and means responsive to the charge on the capacitor for supplying a signal when the charge on the capacitor is discharged to a predetermined value.

6. A controller for sequencing and timing the operations of a resistance welder comprising: a single timing capacitor, means for impressing a predetermined charge on the capacitor, a plurality of separate discharge circuits for the timing capacitor each including an adjustable resistor and a electronic switch which is switchable from a nonconducting condition to a conducting condition, said discharge circuits being arranged for discharging the capacitor when any of the switches are in said conducting condition at a rate determined by the resistance of the adjustable resistor in circuit with the conducting switch, means for sequentially switching the switches from a nonconducting condition to a conducting condition in response to an input signal, means responsive to the charge on the capacitor for supplying an output signal and recharging the capacitor when the charge on the capacitor is reduced to a predetermined value, and means responsive to the output signal for supplying the input signal to the means for switching the electronic switches in response to the output signal.

7. A controller for programming and timing a plurality of separate operations in a resistance welder apparatus, a source providing half cycles of alternating polarity current, first signal means providing an output signal at each instant of reversal in polarity of the current, second signal means providing an output signal change at an identical predetermined instant during each of the half cycles of current flow, third signal means providing an output signal change at an adjustably variable identical instant during each half cycle, a shift register having a plurality of separate stages equal in number to the number of operations to be timed by the controller, each of said stages being switchable between two stable conditions of operation, means for switching all of the stages to one of said two conditions of operation, a single timing capacitor, means for impressing a predetermined charge on the capacitor, a plurality of separate circuits each including one of the stages and an adjustable resistor, said separate circuits each providing a discharge circuit for the charge on the capacitor when the stage in said discharge circuit is in the other of said two conditions for timing the operation sequences by the stage in said other condition, a fourth signal means responsive to the charge on the capacitor for supplying an output signal when the charge on the capacitor is discharged to a predetermined value, a fifth signal means responsive to the output signals from said first, second and fourth signal means providing a signal change for switching the stages sequentially from the said one condition of operation to the said other of the two conditions of operation, and means responsive to the output signals from the third and fifth signal means and an output signal from a predetermined one of the stages for providing an output signal change at the instants of signal change provided by the third signal means.

8. A controller for programming and sequencing a plurality of separate operations in a resistance welder apparatus, comprising a shift register having a plurality of stages equal in number to the number of operations to be sequenced, a single timing capacitor, means including a unijunction transistor for impressing a predetermined charge on the capacitor and providing an output signal when the charge on the capacitor decreases to a predetermined value, a plurality of impedances each connecting the capacitor to one of the stages for providing a discharge path for the charge on the capacitor when any one of the stages is in one condition of operation, and means including a solid state memory having an input responsive to the output signal and an output for controlling the condition of operation of the stages and for maintaining the charge on the capacitor when all of the stages are in a predetermined condition of operation.

9. A system for sequencing and controlling the duration of a plurality of separate operations, comprising: a shift register having a plurality of stages of transistor pairs equal in number to the number of operations to be sequenced, means for coupling the transistors of each pair together so as to form a flip-flop circuit with each transistor of a pair having two stable conditions of operation, one in which it is conducting and one in which it is nonconducting including means responsive to the shifting of one transistor from one condition to the other condition to cause the other transistor to shift its condition so the transistors of each pair are switched to opposite conditions, means for applying an operational pulse simultaneously to each of said stages to cause one of the transistors in each pair to be conducting and the other transistor of each pair to be nonconducting, a single timing capacitor, circuit means for impressing a charge on the capacitor, a plurality of separate discharge circuits for the timing capacitor, each of said discharge circuits including an impedance and one of the said other transistors of each stage for discharging the timing capacitor through any of the said other transistors which is in a conducting condition, means for applying a signal to a stage controlling the first of said sequence of operations for causing the said other transistor in said stage to switch to its conducting condition for discharging the timing capacitor through the impedance in circuit therewith at a rate determined by the value of said impedance, means including a solid state memory having an input responsive to the charge on the timing capacitor for supplying an output signal change when the charge on the timing capacitor is reduced to a predetermined value and for maintaining the charge on the capacitor when the said other transistors in all of the stages are in a nonconducting condition, and means responsive to the output signal change coupling each stage with an adjacent stage for supplying a switching signal for switching the said other transistor in any of stages from its conducting to its nonconducting condition and for switching the said one transistor in any stage controlling an operation in the sequence immediately succeeding a stage having a said other transistor in its conducting condition from a conducting to a nonconducting condition.

10. A controller for programming and sequencing a plurality of separate operations in a resistance welder apparatus, comprising a shift register having a plurality of stages equal in number to the number of operations to be sequenced, a single timing capacitor, means including a unijunction transistor for impressing a predetermined charge on the capacitor and providing an output signal when the charge on the capacitor decreases to a predetermined value, a plurality of impedances each connecting the capacitor to one of the stages for providing a discharge path for the charge on the capacitor when any one of the stages is in one condition of operation, means including a solid state memory having an input responsive to the output signal and an output for controlling the condition of operation of the stages and for maintaining the charge on the capacitor when all of the stages are in a predetermined condition of operation, circuit means including an initiating switch having normally open contacts for switching one of said stages to said one condition of operation upon closure of said contacts and circuit means including a NOR logic unit having a transistor connected in a circuit with the initiating switch to be conducting when the initiating switch has open contacts.

11. A controller for programming and sequencing a plurality of separate operations in a resistance welder apparatus, comprising a shift register having a plurality of stages equal in number to the number of operations to be sequenced, a single timing capacitor, means including a unijunction transistor for impressing a predetermined charge on the capacitor and providing an output signal when the charge on the capacitor decreases to a predetermined value, a plurality of impedances each connecting the capacitor to one of the stages for providing a discharge path for the charge on the capacitor when any one of the stages is in one condition of operation, means for sequentially switching the stages to the said one condition of operation, and means including a solid state memory having an input responsive to the output signal and an output for controlling the sequencing of the stages and for maintaining the charge on the capacitor when all of the stages are in a predetermined condition of operation.

12. A heat control circuit for a resistance welder comprising a transistor having a base electrode, an emitter electrode and a collector electrode, a source providing half cycles of a reversing polarity current signal at an output terminal, circuit means connecting the base electrode to the terminal for switching the transistor to a conductive state when the signal at the terminal has one polarity and to a nonconductive state when the signal at the terminal has a polarity opposite the said one polarity, circuit means connected to the base electrode biasing the transistor toward a conductive state for causing the periods of conduction and nonconduction of the transistor to be exactly equal when the transistor is switched by the signal at the terminal and means for adjusting the instant of reversal in polarity of the current signal at the terminal relative to the instant of reversal of the current signal of the source.

13. The combination as recited in claim 12 which includes a pair of additional transistors which have the same operating characteristics as the transistor which has its base connected to the terminal and which pair of additional transistors each have an electrode connected to the base electrode for compensating the operating characteristics of the transistor for variations in temperature.

References Cited

UNITED STATES PATENTS 3,016,470    1/1962    Van Dine \_\_\_\_\_\_\_\_\_\_ 307—88.5

OTHER REFERENCES

Shea: Transistor Circuit Engineering, May, 1958, pg. 119 relied on.

ARTHUR GAUSS, *Primary Examiner.*

D. D. FORRER, *Assistant Examiner.*

UNITED STATES PATENT OFFICE
CERTIFICATE OF CORRECTION

Patent No. 3,378,696                                           April 16, 1968

James T. Eckl et al.

It is certified that error appears in the above identified patent and that said Letters Patent are hereby corrected as shown below:

Column 4, line 1, "R16" should read -- D16 --; line 54, "erminal" should read -- terminal --. Column 6, lines 35 and 40, "at", each occurrence, should read -- as --. Column 9, line 72, "itnernal" should read -- interval --. Column 10, line 49, cancel "and", first occurrence. Column 11, line 20, treminal" should read -- terminal --; line 50, "NB" should read N8 --. Column 13, line 58, "NOR4" should read -- NOR N4 --. Column 14, line 34, after "approaches" insert -- the --. Column 15, line 74, "NOR N2" should read -- NOR N22 --. Column 16, line 28, cancel "by"; line 41, "C22" should read -- C2 --. Column 17, line 35, after "vided" insert -- by the capacitor --. Column 20, line 49, after "SW1" insert -- remains --. Column 22, line 3, "change" should read -- changing --; lines 39 and 55, "NOR", each occurrence, should read -- NORS --. Column 24, line 64, "a" should read -- an --.

Signed and sealed this 25th day of November 1969.

(SEAL)
Attest:

EDWARD M. FLETCHER, JR.                          WILLIAM E. SCHUYLER, JR.
Attesting Officer                                        Commissioner of Patents